United States Patent Office 2,928,740
Patented Mar. 15, 1960

2,928,740

FOOD FLAVORING COMPOSITION AND METHOD OF ENHANCING THE FLAVOR OF FOODS

Waldemar A. Rosenthal and Hamilton A. Pinkalla, Milwaukee, Wis., assignors to American Bio-Synthetics Corporation, Milwaukee, Wis., a corporation of Wisconsin No Drawing. Application July 28, 1958
Serial No. 751,134

9 Claims. (Cl. 99—17)

This invention relates to improvements in compositions consisting essentially of vegetable hydrolysates and an autolysate of the yeast species known as *Torulopsis utilis*, for intensifying and supplementing the flavors of foods.

Hydrolysates derived from vegetable proteins such as those from wheat, corn, rice, soya bean, yeasts and the like are known commercial products formed by a process which retains the edibility of the original materials. Such hydrolysates have high food value and have a pleasing flavor if any flavor, other than saltiness, is at all perceptible. Hence, such hydrolysates are suitable for and are frequently used as additives to food. The hydrolysates may be made by the use of any hydrogen donor and one method for making such hydrolysate is outlined below.

The species of yeast known as *Torulopsis utilis* or torula yeast has become commercially available at a cost such that it can be used generally for food purposes rather than used only for special diet supplementary purposes as is true of the *Saccharomyses cerevisiae* yeasts heretofore available. Such torula yeast is now available in dry (5% moisture) inactive form. Both dry torula yeast and its autolysates have a mild and pleasant flavor rather than a high and (to some persons) distinctly unpleasant flavor as is true of the dried and debittered brewer's yeast (*S. cerevisiae*) now available for special dietary use.

We have found that a mixture of a vegetable protein hydrolysate and a torula yeast co-hydrolysate made by autolyzing the yeast in the presence of the vegetable hydrolysate, has a pleasing flavor and has the result of fixing and intensifying the flavor of other foods. Such fixing and intensification of flavors is especially useful in foods having bland or subtle flavors resulting from blending of low flavor constitutents. Also, our composition has the effect of apparently restoring the flavor of foods which have been subjected to excessive oxidation or other conditions tending to destroy the original flavor of the food. Soups, meats, cheese spreads, baby foods and the like are especially improved by our mixtures as the bland or subtle flavors are intensified and supplemented, and the loss of flavor in making cheese spreads (from oxidized cuttings and scraps of cheese) is overcome and the resulting product is up-graded in flavor.

As an example of the preparation of a vegetable hydrolysate, wheat gluten is mixed with excess concentrated hydrochloric acid and refluxed for 6 to 12 hours. During heating we periodically determine the ratio of amino acids to total protein content as we desire to obtain a maximum of amino acids. Hence, when the ratio of amino acids to total protein no longer rises, the end point has been reached and heating is stopped. The humins are then filtered off and the filtrate is neutralized with sodium hydroxide.

We use a concentration of sodium hydroxide to arrive at a 16% solution of sodium chloride in the hydrolysate. We control the rate of addition of the sodium hydroxide to the hydrolysate so that the temperature of the hydrolysate, during the neutralization step, does not rise above 25° C. as we find changes in the protein and amino acids resembling the burning of such materials, upon exceeding that temperature during the neutralization. After neutralization the hydrolysate is an opaque light brown liquid which may be again filtered if a clearer product is desired. Control of temperature during neutralization is critical to obtaining the desired product.

The hydrolysate has a high content of the hydrochlorides of amino acids. We do not de-colorize the hydrolysate as we find that de-colorization absorbs some of the amino acids. A typical analysis of a vegetable hydrolysate is as follows:

| | |
|---|---|
| Baumé (sp. g.) | 25.0 at 72° C. |
| Weight per gal. lbs | 10.0 |
| pH | 5.2 |
| Total nitrogen percent | 3.55 |
| Amino nitrogen do | 2.07 |
| Protein (N×6.25) do | 22.2 |
| Ammonium and sodium chloride do | 16.43 |
| Mono sodium glutamate do | 2.56 |
| Total solids do | 38.63 |
| Solids (lbs. per gal.) lbs | 4.03 |

The solids of the above hydrolysate are substantially entirely protein. Commercially obtainable waste vegetable protein hydrolysates may also be used provided the temperatures of neutralization have not exceeded 25° C. Such wastes are the mother liquors resulting from the fractional crystallization of wheat and corn gluten in the commercial production of glutamic acid.

The yeast is approximately ½ protein and we desire to obtain a total protein to sodium chloride ratio of 2.2–2.5 to 1.0 which is critical to making a non-filtered non-settling colloid which can be stored and used without further treatment. (The carbohydrates of the yeast do not affect the desired properties of our final product.) Hence, we now mix the vegetable hydrolysate with the torula yeast dried to no more than 5% moisture and at a temperature inactivating the yeast, preferably in the proportion by weight of 2.7–3.7 of the hydrolysate-sodium chloride solution to 1.0 of the dried torula yeast. The mixture is kept at not more than 40° C. and preferably 37–40° C. for 20–24 hours with stirring, to obtain substantially complete autolysis of the yeast without substantial change in the yeast proteins from their original form. Keeping the temperature of the vegetable protein below 25° C. during neutralization is critical but the mixture can be heated to 40° C. which is an unexpected and seemingly contradictory condition in our process. Treatment above 40° C. undesirably affects our processing and final product. The time of digestion of the mixture above 20 hours, depends on the viscosity allowable to allow handling of the mixture by pumps, the mixture rapidly becoming more viscous after 24 hours.

We desire a final product which will not settle during a time such as three months, which is a practical "shelf life," but which can be pumped by usual equipment and which contains a maximum of protein consistent with the above conditions. We have found that a ratio of 2.2–2.5 parts total protein to 1.0 part of salt yields the desired product. If less salt is used, the final product is not liquid and if more salt is used, the solids in the product settle relatively quickly.

The mixture of the vegetable protein hydrolysate and of the torula yeast autolysate is then ready for use. The final product is a buff colored paste and contains a high proportion of amino acids and their derivative polypeptides and fragments of proteins of less than the usual protein molecular size. Hence, much of the present proteins are directly assimilable as amino acids and the balance of the protein is in a form requiring a minimum of digestive action in human metabolism. The final product is a colloidal sol which cannot be filtered, which will not settle in longer than the usual storage time for processed food products, but which can be readily poured and which can be pumped by the usual equipment. The product readily mixed with both aqueous and fatty foods and helps to emulsify the latter. The mild and pleasant taste in the final product is believed to be largely due to its amino acid and protein fragment content. The composition resists the action of bacteria and is otherwise highly stable so many lots have been stored without change for more than 12 months.

Tests were made with our composition in the manufacture of process cheese spreads, using cheese of the American and Cheddar varieties to make lots of each cheese respectively containing 1, 2, 3 and 4% of our composition. Our vegetable hydrolysate-torula yeast autolysate is a smooth paste and acts as an emulsifier for the cheese so that the texture of the cheese spreads are improved. In addition to the qualities of making the cheese spreads easier to manufacture, the present composition also produces creamier and smoother cheese spreads than those now on the market which is advantageous to the user.

The test samples were made by the Dairy Department of a large State university and taste panels of 100 persons were used three times to determine the user's reaction to the flavor of cheese spreads made with our products. In each of the taste panel tests, more than 90% of the persons involved voted in favor of the cheese spreads made with our products as compared to the same cheese spreads without our products. It should be said that change in flavor of the cheese spreads is noted by amateur tasters in the 4% concentration; whereas, experienced tasters noticed such difference in flavor in all concentrations of our composition. The experienced tasters, however, also approved the taste of cheese spread by a large majority, and at all concentrations. The tests indicate that the flavor of the cheese spreads with our product added, is higher than the flavor of the cheese alone plus the flavor of our hydrolysate-autolysate and indicate a synergistic action.

We claim:

1. The method of enhancing and correcting flavor of foods, comprising the steps of preparing a hydrolysate of a vegetable protein, preparing an autolysate of *Torulopsis utilis* by adding the hydrolysate to the dried yeast in ratio of 2.7–3.7 by weight of hydrolysate to 1.0 by weight of yeast dried to no more than 5% moisture content whereby the yeast proteins are retained in substantially their original form, and adding 1–5% of the mixture to the food with agitation until the food is again homogeneous.

2. The method of enhancing and correcting flavor of foods, comprising the steps of preparing a hydrolysate of proteinaceous vegetable material by heating with concentrated HCl until the ratio of amino acids to total protein content of the hydrolysate no longer rises, neutralizing the hydrolysate with sodium hydroxide to secure a 16% content of sodium chloride and then preparing an autolysate of *Torulopsis utilis* by adding the hydrolysate to the dried yeast and in the proportion by weight of 2.7–3.7 hydrolysate to 1.0 of yeast, and adding 1–5% of the mixture to the food with agitation until the food is again homogeneous.

3. The method of enhancing and correcting flavor of foods, including the steps of preparing a hydrolysate of proteinaceous vegetable material by heating with concentrated HCl until the ratio of amino acids to total protein content of the hydrolysate no longer rises, neutralizing the hydrolysate with sodium hydroxide to secure a 16% content of sodium chloride, the sodium hydroxide being in a concentration and added at a rate to keep the hydrolysate below 25° C., preparing an autolysate of *Torulopsis utilis* yeast by adding the hydrolysate to the yeast dried to no more than 5% water content and in the proportion by weight of 2.7–3.7 hydrolysate to 1.0 of yeast, and adding 1–5% of the mixture to the food with agitation until the food is again homogeneous.

4. The method of enhancing and correcting flavor of foods, including the steps of preparing a hydrolysate of proteinaceous vegetable material by heating with concentrated HCl until the ratio of amino acids to total protein content of the hydrolysate no longer rises, neutralizing the hydrolysate with sodium hydroxide to secure a 16% content of sodium chloride and then preparing an autolysate of *Torulopsis utilis* yeast by adding the hydrolysate to the yeast dried to no more than 5% water content and at a temperature inactivating the yeast and in the proportion by weight of 2.7–3.7 hydrolysate to 1.0 of yeast, and agitating the mixture at no more than 40° C. whereby the yeast is autolysed without substantial change in form of the yeast proteins, and adding 1–5% of the mixture to the food with agitation until the food is again homogeneous.

5. In the method of enhancing and correcting flavor of foods, the steps of preparing a hydrolysate of proteinaceous vegetable material by heating with excess HCl until the ratio of amino acids to total protein content of the hydrolysate no longer rises, neutralizing the hydrolysate with sodium hydroxide to secure a 16% content of sodium chloride, the sodium hydroxide being in a concentration and added at a rate to keep the hydrolysate below 25° C., preparing an autolysate of *Torulopsis utilis* yeast by adding the hydrolysate to the yeast dried to no more than 5% water content and at a temperature inactivating the yeast and in the proportion by weight of 2.7–3.7 hydrolysate to 1.0 of yeast, and agitating the mixture at no more than 40° C. whereby the yeast is autolysed without substantial change in form of the yeast proteins, and adding 1–5% of the mixture to the food with agitation until the food is again homogeneous.

6. A composition for improving the flavor of foods and consisting of a hydrochloric acid hydrolysate of proteinaceous vegetable material with a high ratio of the amino acids to total protein and neutralized with sodium hydroxide at a temperature of no more than 25° C., and dried *Torulopsis utilis* yeast mixed with the hydrolysate to secure a ratio of 2.7–3.7 of liquid to solids, the yeast being dried to no more than 5% moisture, the mixture being held until autolysis of the yeast is substantially complete but without substantial change of the yeast protein from its original form.

7. A composition for improving the flavor of foods and consisting of a hydrochloric acid hydrolysate of proteinaceous vegetable material with a high ratio of amino acids to total protein ratio and neutralized at no more than 25° C. with sodium hydroxide to secure a 16% sodium chloride content, and dried *Torulopsis utilis* yeast mixed with the hydrolysate in the ratio by weight of 2.7–3.7 of the hydrolysate to 1.0 of the yeast, the yeast being dried to no more than 5% moisture and at a temperature to inactivate the yeast, the mixture being held before use until autolysis of the yeast is substantially complete but without substantial change of the yeast protein from its original form.

8. A composition for improving the flavor of foods and consisting of a hydrochloric acid hydrolysate of proteinaceous vegetable material heated until the amino acids to total protein ratio no longer rises and neutralized with sodium hydroxide, the neutralization temperature being kept below 25° C., and dried *Torulopsis utilis* yeast mixed with the hydrolysate in the ratio by weight of 2.7–3.7 of the hydrolysate to 1.0 of the yeast, the yeast being dried to no more than 5% moisture, the mixture being held at no more than 40° C. until autolysis of the yeast is substantially complete but without substantial change of the yeast protein from its original form.

9. A composition for improving the flavor of foods and consisting of a hydrochloric acid hydrolysate of proteinaceous vegetable material heated until the amino acids to total protein ratio no longer rises and neutralized with sodium hydroxide to form a 16% sodium chloride content, the neutralization temperature being kept below 25° C., and dried *Torulopsis utilis* yeast mixed with the hydrolysate in the ratio by weight of 2.7–3.7 of the hydrolysate to 1.0 of the yeast, the yeast being dried to no more than 5% moisture and at a temperature to inactivate the yeast, the mixture being heated at no more than 40° C. until autolysis of the yeast is substantially complete but without substantial change of the yeast protein from its original form.

References Cited in the file of this patent

UNITED STATES PATENTS

| | | |
|---|---|---|
| 1,611,531 | Kahn et al. | Dec. 21, 1926 |
| 2,764,487 | Wickerham et al. | Sept. 25, 1956 |

FOREIGN PATENTS

| | | |
|---|---|---|
| 478,570 | Great Britain | Jan. 17, 1938 |
| 614,311 | Great Britain | Dec. 14, 1948 |